United States Patent [19]

Wicks et al.

[11] 4,072,420
[45] Feb. 7, 1978

[54] MICROFILM CARD DUPLICATION

[75] Inventors: Anthony John Wicks, London; Eric Terence Wilson, Medstead, both of England

[73] Assignee: Wicks & Wilson Limited, London, England

[21] Appl. No.: 652,146

[22] Filed: Jan. 26, 1976

[30] Foreign Application Priority Data

Apr. 8, 1975  United Kingdom .............. 14404/75

[51] Int. Cl.² .............................................. G03B 27/30
[52] U.S. Cl. ...................................... 355/100; 271/64;
355/78; 355/97
[58] Field of Search ....................... 355/78, 95, 97, 99,
355/100, 133; 271/64

[56] References Cited

U.S. PATENT DOCUMENTS

| 3,248,104 | 4/1966 | Grabowski et al. | 355/78 X |
| 3,468,606 | 9/1969 | Wolf et al. | 355/91 |
| 3,535,039 | 10/1970 | Lakin et al. | 355/100 |
| 3,595,561 | 7/1971 | Leblant | 355/97 X |
| 3,672,771 | 6/1972 | Lakin | 355/100 |
| 3,726,590 | 4/1973 | Kistner et al. | 355/100 |
| 3,748,039 | 7/1973 | Kuhn | 355/97 X |

Primary Examiner—Fred L. Braun
Attorney, Agent, or Firm—Toren, McGeady and Stanger

[57] ABSTRACT

A microfilm card duplicating machine is arranged to feed master cards sequentially to a copying station. The master cards have images thereon for duplication by the machine. Copy cards are fed by the machine one by one to the copying station for producing a required number of copies. The copy cards and master cards are routed to a receiving station after copying while the master card is delayed such that it arrives at the receiving station only when its duplicate copy card(s) have been delivered thereto. The sequential delivery enables the formation of an interleaved stack of master and copy cards arranged with the copy card(s) being preceded in each case by the associated master card.

18 Claims, 15 Drawing Figures

MICROFILM CARD DUPLICATION

BACKGROUND OF THE INVENTION

This invention relates to microfilm card duplicating machines in which image copying of master card photographic images onto duplicate cards is effected.

Microfilm card duplicating machines accept master cards containing photographic images and also copy cards containing photo sensitive pieces of film of approximately the same size as the master image. By means of exposing and developing devices built into the machines the images from the master cards are duplicated on to the copy cards as required. In many instances the master cards also contain punched card information relating for example to a numerical designation or other classification in the form of punched holes. Frequently it is necessary to duplicate both the microfilm image and the punched holes.

The duplication of the two types of information can be achieved in one of four alternative ways:

1. Unexposed copy cards can be prepunched in separate punching equipment as required and to correspond to the punched data on respective master cards to be duplicated. The punched copy cards are then fed through a microfilm card duplicating machine in sequence with their respective master card to reproduce the microfilm image onto the copy cards. Providing that the sequence of master and copy cards and the quantities of copy cards per master is correct, each master card image will be duplicated only on to copy cards having the same holes as the master. This is achieved by carefully keeping the decks of copy cards and master cards in exactly the right order. A misplacement of just one master or copy card would cause some or all duplicate copies from that point on in the production run to have film images and punched holes imcompatible to each other. Although this method is most commonly used, there is high risk of error and visual checking of copy card decks before distribution is often necessary.

To overcome this problem verifying units have been made that compare the holes in master and copy cards just prior to the imaging exposure and stop the copying process in the event of a mismatch. The incorporation of this comparator device increases considerably the cost of the duplicator particularly where complex punch coded information is to be accommodated.

2. Unpunched copy cards are exposed in the microfilm card duplicator so that the micro image is transferred to a required number of copy cards for each master card. The copy cards are then stacked in sequence and the master cards separately stacked in the same sequence. The stack of unpunched copy cards and the stack of master cards which are punched are transferred to a key punch machine. This machine can be operated either manually by reading the information from the punched master or, semi-automatically, by feeding the master manually into an automatic copying punch at the appropriate time. Either way the copy cards are punched in the machine with the same information as the masters.

This method is very difficult to control because it is difficult to know which microfilm image is on which card without constantly looking at the cards in a reader which projects the image back to readable size. This method is not used frequently.

3. The images from the master cards are first reproduced onto unpunched copy cards and then the master cards and copy cards are manually interleaved so that each master card is followed by the unpunched copy cards containing the image of that particular master. These interleaved decks are then transferred to a key punch machine such as an IBM 029, which is operated in a semi-automatic mode whereby it reproduces each master on to its succeeding copy cards. Here again any human error in arranging the interleaved deck can cause significant errors and the manual labour involved in arranging interleaved decks is not always acceptable.

4. Another method of obtaining punched data and film image data accurately duplicated is to use a card duplicating machine that punches the copy data in at the same time as the image is transferred. This is traditionally the most reliable method but Card reproducers which do this are extremely expensive. Many card users who have card duplicating requirements of such a volume that the above problems are of concern to them, already have conventional reproducing punch machines that they use to punch their master cards. To purchase an additional machine that contains image duplication with punch hole duplication would duplicate unnecessarily the punching facility.

SUMMARY OF THE INVENTION

It is an object of the present invention to enable automatic interleaving of exposed copy cards and master cards to facilitate feed to a subsequent processing stage e.g. a punching stage.

According to the invention there is provided a microfilm card duplicating machine comprising means for feeding copy cards sequentially to an image reproducing means for duplicating images carried by master cards fed thereto onto one or more copy cards per master means for routing copy and master cards to a receiving station after copying and master card delaying means for enabling delivery of a master card to the receiving station only when its duplicate copy card(s) have been delivered thereto to form an interleaved stack of master and copy cards arranged with said one or more copy cards being preceded in each case by the associated master card. The delaying means may comprise a hold station arranged to receive a master card after exposure to reproduce the, or the last, copy therefrom and to retain the master card for a predetermined delay period.

The master cards may be fed to the receiving station in separate guide tracks which are adjacent and preferably parallel at the ends disposed at the entry to the receiving station.

In a particularly advantageous form of the invention the receive station has two hoppers disposed to opposite sides of an axis extending between and parallel to the guide tracks at the receive station end and a selector guide is provided to selectively direct the master cards and duplicate copy cards to one or the other hopper.

BRIEF DESCRIPTION OF THE DRAWINGS

In order that the invention and its various other features may be understood more easily a microfilm card duplicator embodying the invention will now be described, by way of example only, with reference to the drawings, wherein.

DESCRIPTION OF THE PREFERRED EMBODIMENTS

Figure 2:
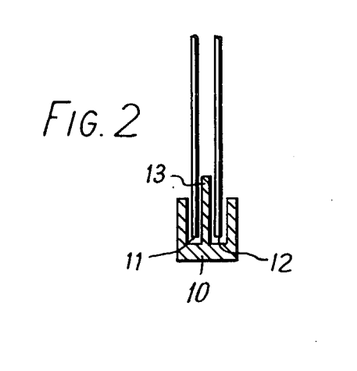
FIG. 2 is a sectional view of the track of the duplicator of FIG. 1 taken on the section line A—A.

The machine illustrated in the drawings comprises an extruded track 10 which as can be seen in FIG. 2 has two upwardly extending guide channels 11 and 12 separated by a central rib 13. The guide channels 11 and 12 serve to receive and guide copy cards and master cards respectively which are transportable on edge along the channels by means of drive rollers as hereinafter described.

Figure 1:
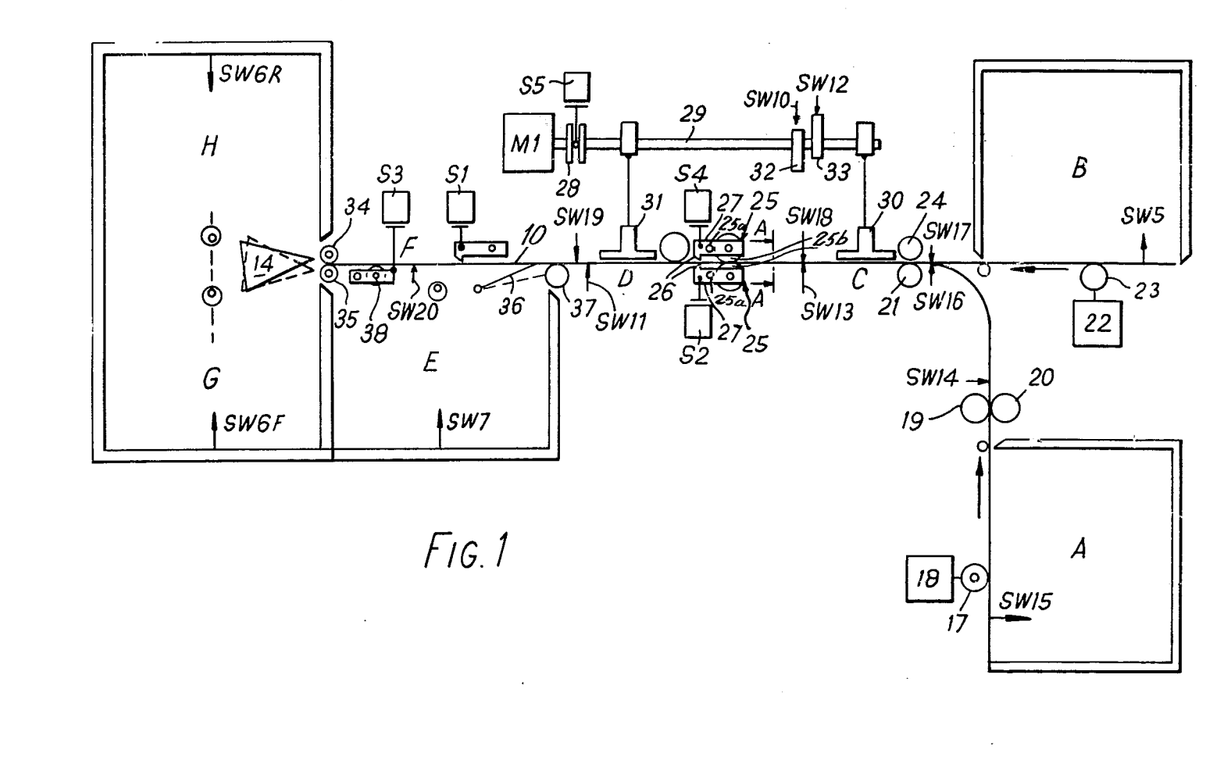
FIG. 1 is a schematic overplan view of the microfilm card duplicator
Figure 3:
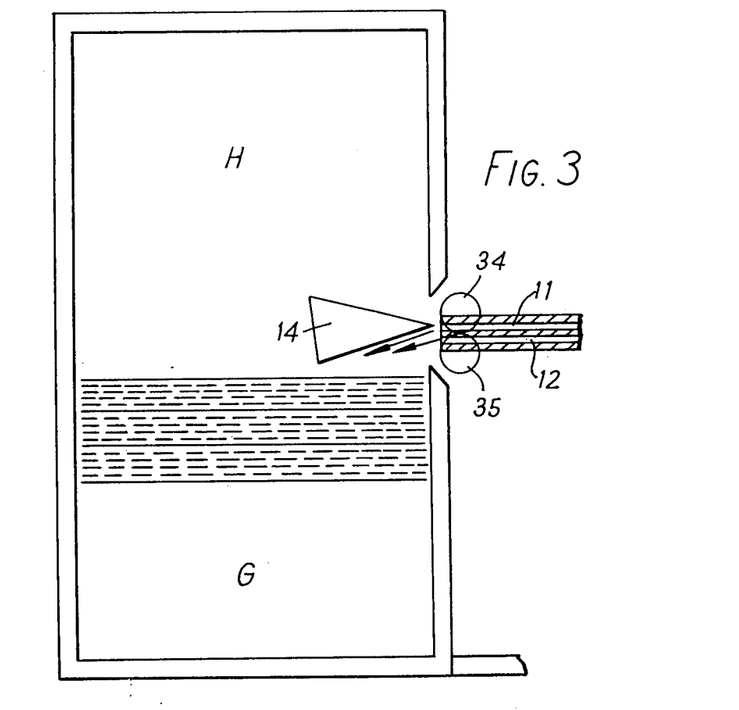
FIGS. 3 to 5 show diagrammatic views of card routing in each of three possible presettable guiding dispositions of a selector guide.
Figure 4:
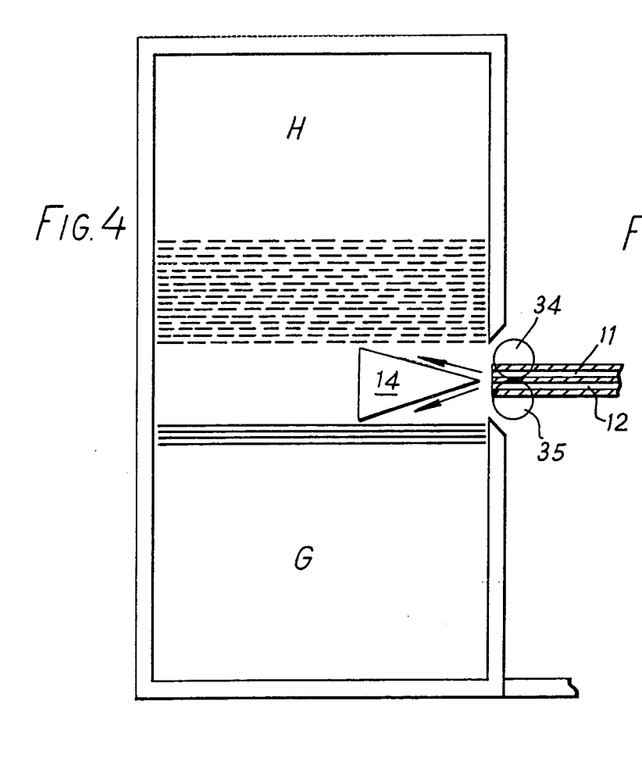
Figure 5:
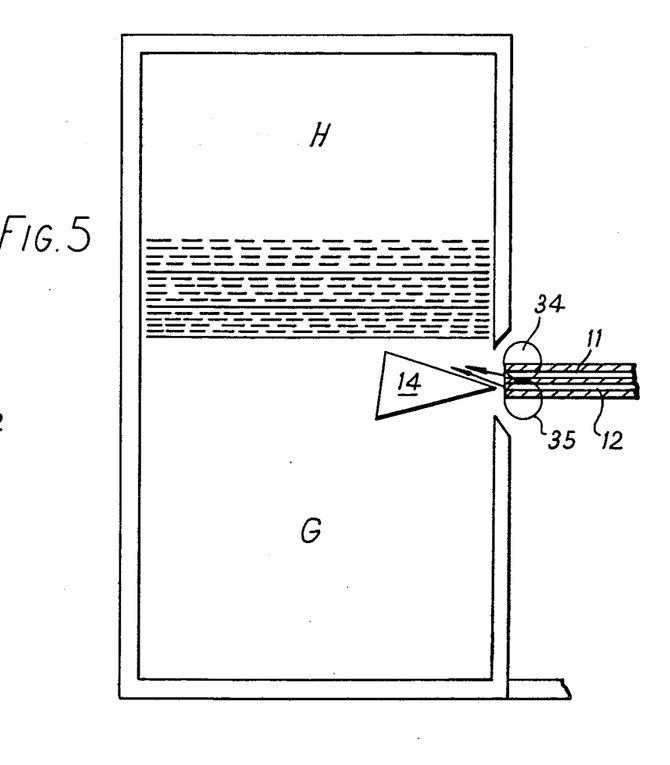

FIG. 1 shows the track routing from a master card feed hopper A past a copy card feed hopper B, exposure station C, developer station D, master card receive hopper E, master card hold station F to front and rear copy card receive hoppers G and H respectively. At the receive hopper end of the track is mounted a selector guide 14 forming a nose of triangular form. The guide 14 is pivotally mounted and selectively adjustable to routecopy cards(shown by dotted lines) and master card (shown by solid line) into one or the other receive hoppers G or H by directing the apex of the triangular guide to one side or the other side of the track, as shown in FIGS. 3 and 5 respectively. By feeding all copies from a single master to the hopper prior to releasing the master for feeding to the hopper it will be seen that a stack formed of groups of copies followed by their respective master is formed. Alternatively the guide can be set to separate master card and copy cards into separate stacks in hoppers G and H respectively by directing the apex of the triangular guide between guide channels 11 and 12 as shown in FIG. 4. The reason for the alternative hoppers for stacking copy and master cards will be explained later.

Figure 6:
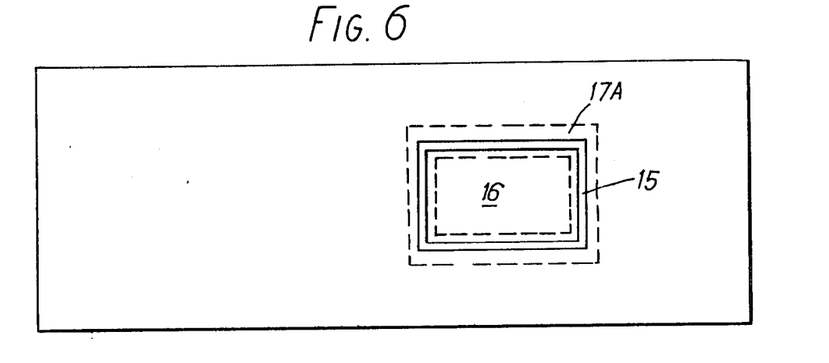
FIG. 6 shows a plan view of a typical master card.

As can be seen in FIG. 6 the master card is of oblong form and is provided with a cut out 15. A master microfilm negative 16 is mounted in the cut out 15 by means of a strip of transparent adhesive tape 17A which extends around and projects slightly into the cut out. The card is normally printed on one side with words and symbols (logos) that relate to the project to which the card is applied and for visual recognition of punched holes from the upper side as shown in FIGS. 7 and 8.

Figure 7:
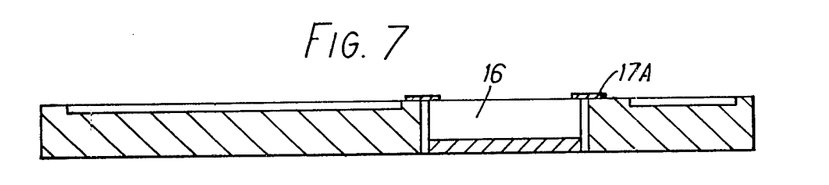
FIGS. 7 and 8 are sectional views taken longitudinally of two alternative types of master or aperture card.
Figure 8:
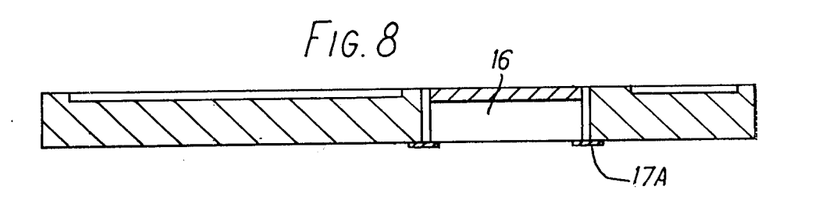

Clearly the adhesive tape can be mounted on upper or lower sides of the card as shown in FIGS. 7 and 8 respectively but in each case the non-imaged side of the microfilm must be secured to the adhesive surface so that in FIG. 7 the imaged side is facing downwards, i.e. in the opposite direction to the printing and in FIG. 8 the imaged side is facing upwards that is in the same direction to the printing. Many microfilm master images (first generation) are created by using a microfilm camera that accepts rolls of 35 mm wide camera films. After processing such films are cut into separate images and each image mounted into master aperture cards are illustrated in FIG. 7. In some cases the master roll film is contact printed in a roll to roll duplicator to produce a second generation roll of duplicate images. Similarly, these second generation images are cut up and mounted onto aperature cards of the type illustrated in FIG. 8.

Figure 9:
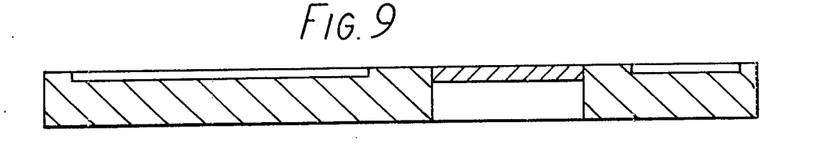
FIGS. 9 and 10 are sectional views taken longitudinally of two alternative types of copy card.
Figure 10:
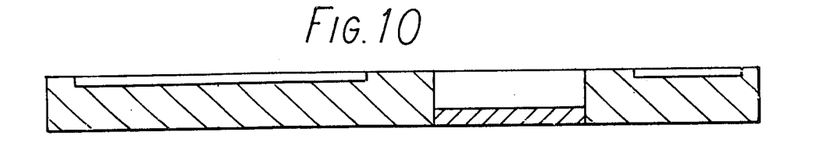

As can be seen in FIGS. 9 and 10 there are similarly two alternative forms of copy card. The copy card is of the same general shape as the master card and has its aperture covered by a photo sensitive material for image copying. In FIG. 9 and 10 the cards carry the printing on the upper surface. FIG. 9 has its photosensitive material mounted with the sensitised surface on the same side as the printed upper surface whilst FIG. 10 has its photosensitive material mounted with the sensitive surface on the same side as the unprinted lower surface.

Figure 11:
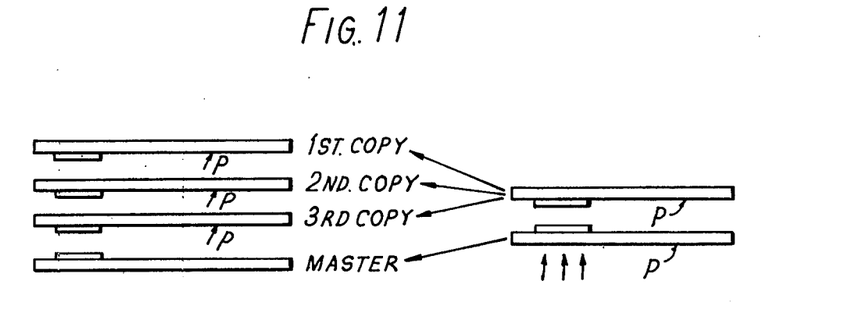
FIG. 11 is a schematic illustration of the production of second generation copies in the duplicator from a first generation master.

In order to provide good resolution in the duplicating process it is necessary for the master and copy cards to be positioned with the image side of the master and the sensitive side of the copy card in contact during the exposure step. If the master card is of the type shown in FIG. 7 then a copy card such as shown in FIG. 9 is required for the reproduction if copy cards are to be produced having the printing and photographic image reproduced for viewing from the same side. This arrangement is illustrated schematically in FIG. 11. If the selector guide 14 is set to route the copies followed by their master into the hopper H then a stack will be formed such that when viewed from the printed side the order in the stack will be master card followed by its copies followed by the next master and its copies and so on. This is the form convenient for processing by semi-automatic punch machines and enables an operator to take a stack of cards and copy the punched information from the master onto its following copy cards. The operator can be assured that all copy cards are the correct way up for punching and that all copy cards before the next master relate to the master being copied. This form of copying is termed first generation to second generation copying.

Figure 12:
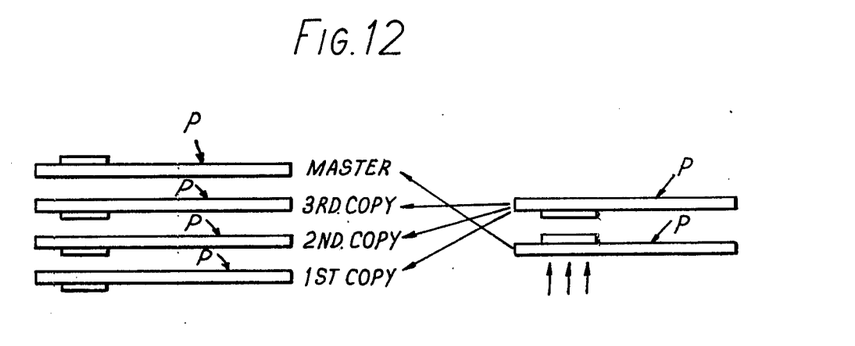
FIG. 12 is a schematic illustration of the production of third generation copies in the duplicator from a second generation copy used as a master.

It is often required that a second generation copy is all that is available for producing further copies. The second generation copy can be used as a master for producing so called third generation copies as is shown schematically in FIG. 12. Once again the imaged side of the master (second generation copy) must be placed in intimate contact with the photosensitive surface of a copy card during the exposure step to maintain high resolution copying. In order that the third generation copy to be produced has printing and photographic image correctly orientated for viewing from one side, a copy card as shown in FIG. 10 must be employed. After copying, if the copy cards followed by the master card are routed to the hopper H as previously described it will be seen that the printing on the copy cards will be facing the opposite way to that on the "master card"

and the stack will be such that the "master" and copy cards are the wrong way up leading to confusion by the punch operator who may think the stack has been inverted. Inversion of the stack however results in the wrong order of presentation to the operator since the copies will be positioned before their respective master in the stack. To avoid this incorrect stacking the selector guide is set to deflect the third generation copies followed by their second generation "master" into the hopper G. As can be seen in FIG. 12 this results in a correct stack being formed in which when viewed from the printed side each master is followed by its associated copies and then by another master and its associated copies and so on. Again, the master and copies are correctly orientated for reading the printing and viewing the image from the top and suitable for further processing by the punch operator without confusion.

It will be apparent that fourth and further generation copies can be made by suitable selection of copy cards, i.e. FIG. 9 type for even generation copies and FIG. 10 for odd generation copies and by routing the cards for stacking in hopper H for even generation and hopper G for odd generation copying.

Microfilm copy cards can be made using a variety of photo sensitive materials. Different photosensitive materials each required different processing techniques. The duplicator described herein uses diazo films which are processed by means of ammonia gas. However, the fundamental aspects of this invention relating to card sequencing and stacking could be applicable to duplicators designed to accept and process other types of photosensitive microfilm copy cards.

The overall function of the diazo microfilm card duplicator will now be described in greater detail.

Figure 13A:
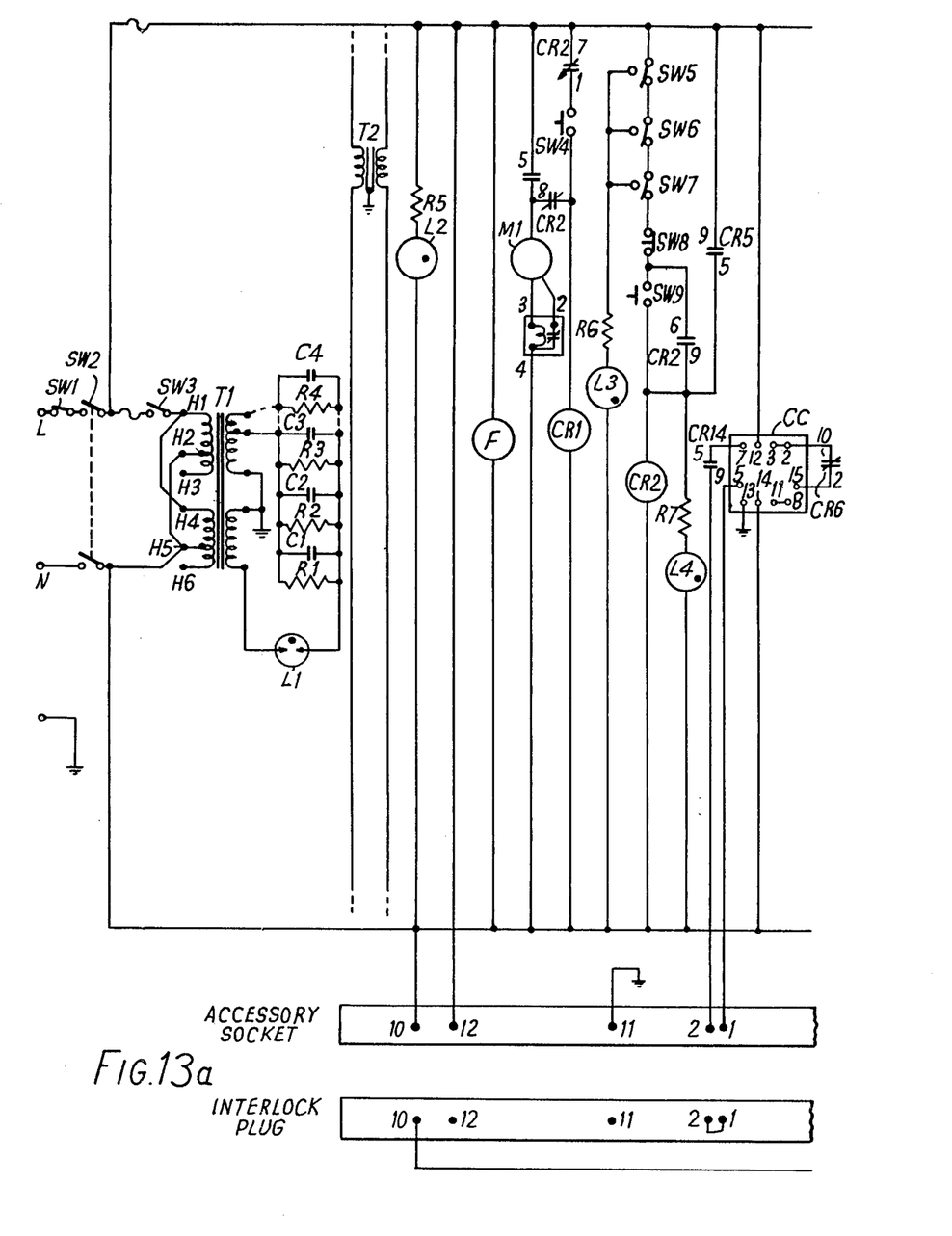
FIG. 13a is a left hand portion of a circuit diagram of the duplicator of FIG. 1.
Figure 13B:
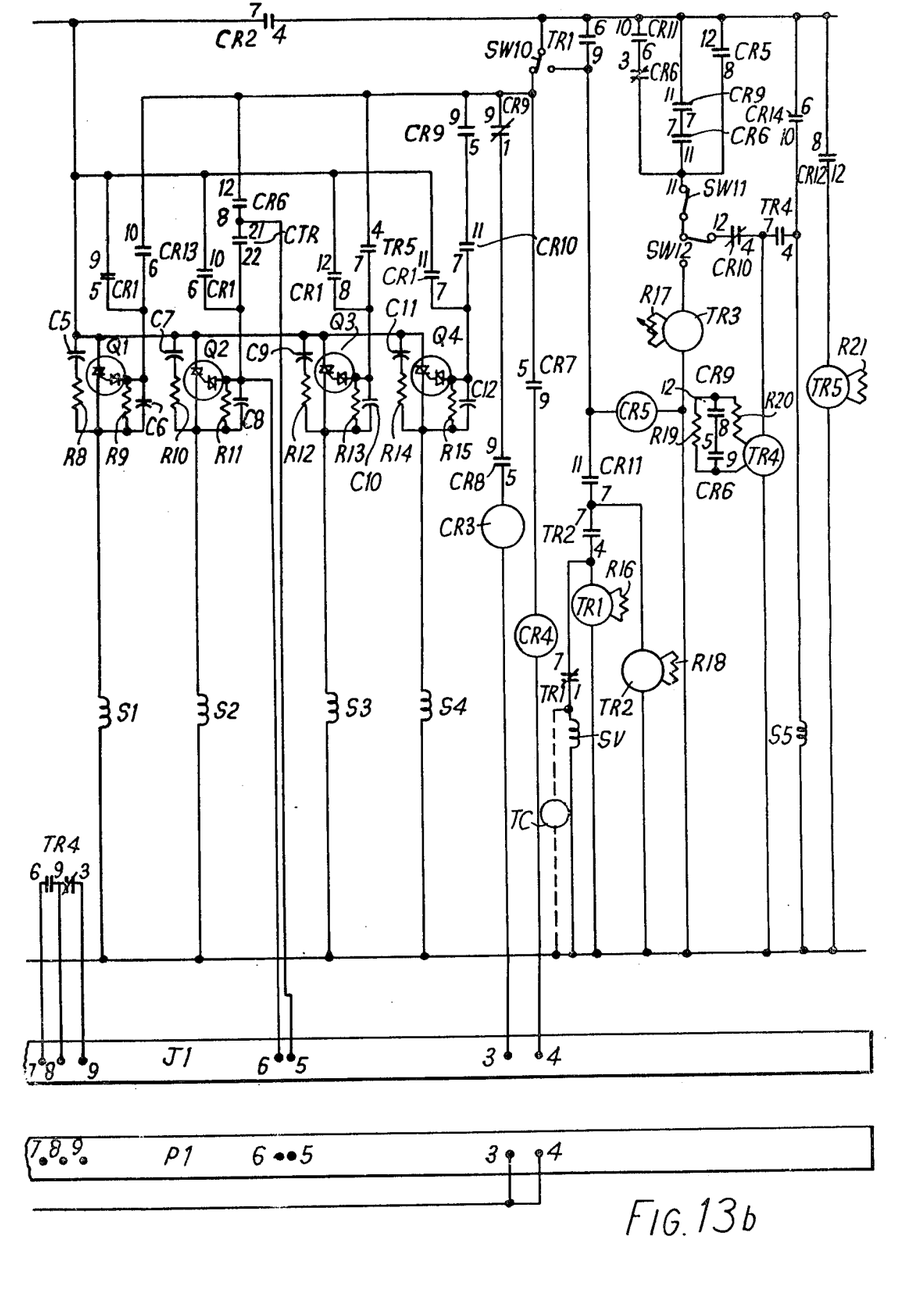
FIG. 13b is an intermediate portion of the circuit diagram of the duplicator of FIG. 1 for location side by side with the diagram of FIG. 13a, and FIG. 13c is a right hand portion of the circuit diagram of FIG. 1 for location side by side with the diagram of FIG. 13b.
Figure 13C:
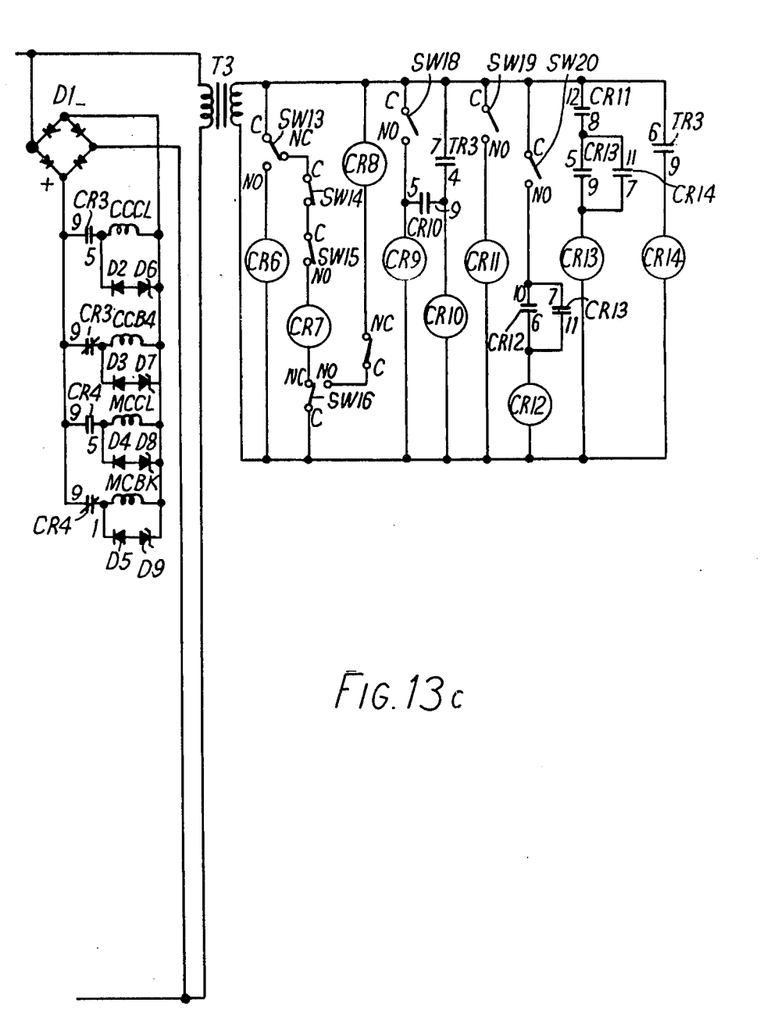

Referring to FIGS. 1 and 13, a stack of master cards is placed in master card feed hopper A and a stack of suitable copy cards is placed in copy card feed hopper B. Closing a Line switch SW2 will apply voltage to the following components:
 1. Power On indicator light L2 located in the Line switch button.
 2. A Lamp and Cabinet Cooling Fan BL1
 3. A Copy Counter CC
 4. An Autotransformer T2 (on 220/240 volt units only)

Closing a Lamp switch applies power to an exposure lamp ballast T1 which causes the exposure lamp to strike and to begin to warm up to full brilliance. After the exposure lamp has reached full intensity (approximately 10 minutes) the print cycle can be initiated by depressing Print switch SW9 to energise a 'Start' relay CR2. Relay CR2 locks itself closed through its normally open contacts CR2 (6-9). Simultaneously, normally open contacts CR2 (5-8) close and apply power to the main drive motor M1, normally closed contacts CR2 (8-2) open to prevent power being applied to a clear relay CR1. Also, normally open contacts CR2 (7-4) close and apply power to the logic circuits and normally closed contacts CR2 (7-1) open to make clear switch SW4 inoperative when the machine is in the print condition.

Feeding the First Master Card and First Copy Card

When power is applied to the logic circuits step down transformer T3 in turn applies power to 'Feed Master' relay CR7 through normally closed contacts of microswitch SW13 located in the master card track to the left of the exposure station and normally closed contacts of microswitches SW16 and SW14 and normally open contacts of SW15 which are closed as long as there are cards loaded into the master card feed hopper A. Energising relay CR7 closes contacts CR7 (5-9) which energise Relay CR4 providing that Interlock Plug P1 is fitted to Accessory Socket S1. Relay CR7 is the Feed Master Clutch/Brake relay, when it is energised a clutch 18 is energised and the brake is released on the drive to a master card friction feeder wheel 17 in the master card feed hopper. The feeder wheel 17 is driven by belt drive from the main motor M1 and forces the next card in the feed hopper A through a separator knife (not shown) and into a master card channel leading to channel 12 and into the nip of master card capstans 19 and 20. As the leading edge of the card leaves the capstans 19 and 20 it actuates a master card hopper exit microswitch SW14 whose normally closed contacts open and remove power from relay CR7 which in turn removes power from relay CR4 which de-energises and removes power from the clutch 18 and reapplies power to a brake on the master card friction feeder wheel. This prevents a second card being fed out of the hopper A when the trailing edge of the first card passes the friction feeder wheel. The card continues to be driven along the track by the capstans 19 and 20 until it reaches capstan 21 which takes over. Just before the leading edge of the master card reaches capstan 21 it actuates microswitch SW16 located at the right of the exposure station C.

When microswitch SW16 is actuated it applies power through its normally open contacts and microswitch SW17 normally closed contacts to relay CR8, the Feed Copy Card relay. When relay CR8 is energised, it contacts CR8 (9-5) apply power to Feed Copy Card Clutch/Brake relay CR3 through normally closed contacts CR9 (9-1) and the accessory socket S1 and Interlock Plug P1. Relay CR9 (the Copy Card in exposure station relay) is de-energised unless there is a copy card in the exposure station. When power is applied to relay CR3 it operates clutch/brake 22 on copy card friction feed wheel 23 and drives a copy card out of the feed hopper B and into the copy card channel 11. Just after entering the copy card channel, the leading edge of the copy card actuates microswitch SW17 situated to the right of the exposure station. When the normally closed contacts on microswitch SW17 open they remove power from relay CR8 which de-energises and removes power from relay CR3 which disconnects the clutch 22 and re-applies the brake to the copy card friction feeder wheel thus preventing the feed of a second copy card. The master card and copy card continue to be fed into and through the exposure station by the drive capstans 21 and 24 at the right of the station. These capstans are placed exactly one card length from two card stop/drive wheel assemblies 25 at the left of the exposure station. As both cards reach their respective stops 26 formed on carriers 27 of the stop/drive wheel assemblies 25 the master card actuates microswitch SW13 and the copy card actuates microswitch SW18. These two microswitches close their normally open contacts and apply power to relays CR6 (Master Card in Exposure Station relay) and CR9 (Copy Card in Exposure Station relay) respectively.

Making the Exposure

When both a master card and a copy card arrive into the exposure station and relays CR6 and CR9 become energised, their normally open contacts CR6 (7-11) and CR9 (7-11) close and apply power to time delay relay TR4 through normally closed contacts of a cam switch SW12, and microswitch SW11 and the normally closed contacts CR10 (12-4). At the same time normally open contacts CR6 (5-9) and CR9 (12-8) close and bypass resistor R19 making the timing period of TR4 about 0.25–0.5 seconds. Time delay relay TR4 provides this delay before the next operation to allow the cards to reach their stops and come to rest after actuating the microswitches SW13 and SW18.

When TR4 times out its normally open contacts TR4 (4-7) close and apply spring wrap power to solenoid S5 which retracts a pawl on an Expose/Develop Clutch 28 allowing it to engage and rotate an exposure and developer platen drive shaft 29 so that exposure platen 30 and developer platen 31 begin to close. After the drive shaft has rotated a few degrees switch cams 32 and 33 are so adjusted that the cam microswitches SW10 and SW12 both actuate. When the normally closed contacts on SW12 open power is removed from solenoid S5 which immediately allows the pawl to release and fall back into a position to engage in the next stop on the spring wrap clutch 28 thus disengaging it. There are two stops on the clutch spaced 180° apart. This has the effect of allowing the drive shaft 29 to rotate exactly 180° from the fully open position to the fully closed or 'clamped' position.

Closing the normally open contacts of cam switch SW10 applies power to relay CR5 which closes its contacts CR5 (5-9) which prevent power being removed from the 'start' relay CR2 (by the 'Stop' button or as a result of running out of cards) until the rest of the expose/develop cycle is completed and the platens have been retracted as explained below. This prevents the machine being stopped with the platens clamped.

When the normally open contacts of cam microswitch SW12 close they apply power to Exposure Time delay relay TR3. The time delay of this relay is adjustable by an exposure control knob located on the front panel of the machines.

OPENING THE PLATENS AND FEEDING THE NEXT COPY CARD

After the required exposure time, TR3 times out and closes its normally open contacts TR3 (4-7) which apply power to the End of Exposure relay CR10 which energises and latches on through its contacts CR10 (5-9) and the normally open contacts of SW18 (which is actuated because there is a copy card in the exposure station). Simultaneously, normally open contacts TR3 (6-9) close and apply power to relay CR14. Energising relay CR14 closes its normally open contacts CR14 (5-9) in the counter 'Count' circuit CC which advances one count provided that pins 1 and 2 on the Accessory socket S1 are shorted by the Interlock plug PI.

When CR14 energises, its contacts CR14 (6-10) close and reapply power to the solenoid S5 controlling the pawl on the Expose/Develop Spring Wrap Clutch 28 which re-engages and beings to rotate the exposure and developer platen drive shaft 29 again to open these platens. After the shaft has rotated a few degrees the cam switches SW10 and SW12 are released. When the normally closed contacts on cam switch SW10 re-close power is applied to the trigger to quadrac Q4 through contacts CR9 (5-9) and CR10 (7-11) which were both closed during the previously described operation. Quadrac Q4 applies power to Solenoid S4 which rotates the friction wheel/stop assembly 25 about a pivot 25a so that the stop 26 which is located to one side of the pivot is retracted from the card and the friction wheel, which is located to the other side of the pivot, is brought into the card path and engages the card so as to drive it out of the exposure station C towards the develop station D. When the trailing edge of the card leaves the exposure station, it releases microswitch SW18 whose normally open contacts open and remove power from relays CR9 and CR10 causing contacts CR9 (5-9) and CR10 (7-11) in the trigger circuit of Quadrac Q4 to open. Quadrac Q6 ceases to supply power to solenoid S4 which releases and allows the friction wheel/stop assembly 25 to return to its rest position. This will act to stop the next card in the exposure station. Simultaneously, as contacts CR9 (9-1) re-close, powder is supplied again to relay CR3 which causes another copy card to be fed into the exposure station as previously described.

THE DEVELOPMENT SEQUENCE

When the first copy card is driven into the developer station D and reaches the card stop it actuates microswitch SW19 which closes its normally open contacts and applies power to relay CR11 (the Card in Developer Station relay). When CR11 energises it closes contacts CR11 (7-11) in the supply to gas solenoid valve circuits. When the second copy card has entered the exposure station C it initiates the Expose/Develop cycle as already described. However, when cam switch SW10 closes its normally open contacts this time, power is fed to the time delay relay TR2 through contacts CR11 (7-11). The time delay set by relay TR2 allows the developer platten to close fully and clamp shut before it times out. When TR2 times out contacts TR2 (7-4) close and apply power to gas solenoid valve SV through normally closed contacts TR1 (7-1). Contacts TR2 (7-4) closing also apply power to Gas Valve time delay relay TR1, which is set for approximately 0.5 secs. When TR1 times out its contacts TR1 (7-1) open and remove power from the solenoid gas valve before the platen is opened (which is set by the minimum exposure time of at least 2 secs). The action of TR2 in delaying the opening of the gas valve prevents the gas being admitted to the developing chamber before it is fully sealed. The action of TR3 in opening the gas valve well before the platen opens allows the gas to be exhausted into the absorber system before being opened to the atmosphere. These two features minimise the odour produced by the machine.

When relay CR11 was actuated by the presence of the copy card in the developer station as described previously, contacts CR11 (8-12) were closed in the circuit supplying relay CR13 (the Exit copy card relay). Therefore, when relay CR14 is energised at the end of the exposure cycle, closing contacts CR14 (7-11) (as described previously), relay CR13 is energised and locks itself shut through contacts CR13 (5-9). When relay CR13 is energised, it closes contacts CR13 (6-10) to trigger Quadrac Q1 and thus apply power to solenoid S1. Energising solenoid S1 causes the copy card in the developer station to be driven from the developer station into a set of continuously rotating pinch rollers 34, 35 which in turn drives it into an output hopper. When the trailing edge of copy card leaving the developer station clears microswitch SW19, power is removed from relay CR11 which opens contacts CR11 (8-12) in the locking circuit of relay CR13 thus removing power from relay CR13. When CR13 releases, contacts (6-10)

open and remove power from Quadrac Q1 and solenoid S1 which prevents the next copy card being fed straight through the developer station.

CHANGING THE MASTER CARD

This sequence of feeding, exposing and developing copy cards continues until the number of copies preset on the Copy Counter have been produced and the end of the exposure of the last copy card in the count has been reached. At this moment the last closure of CR14 (5-9) reduces the count on the counter to zero and therefore the counter closes its output contact CTR (21-22). This closure applies power through contact CR6 (12-8) to the trigger of Quadrac Q2 which energises solenoid S2. This causes the friction wheel/stop assembly 25 controlling the master card in the exposure station to rotate slightly and drive the master card out of the exposure station. Depending upon how a master card Mode Selector Guide 36 is set i.e. 'Separate' or 'Interleave' the master card is either driven into a master card receive hopper E or one of the hoppers H or G via the interleaving hold station. When the trailing edge of the master card leaves, the exposure station, microswitch SW13 returns to the normally closed position and re-applies power to relay CR7 thus causing the next master to be fed from the input hopper A into the exposure station. Simultaneously, power is removed from relay CR6 opening contacts CR6 (8-12) thus removing power from Quadrac Q2 and solenoid S2 allowing the master card exposure station Friction Wheel/Stop assembly 25 to return ready for the next master card. At the same time, releasing CR6 closes normally closed contacts CR6 (10-2) which resets the counter to the present number.

THE INTERLEAVING MODE

If the Mode Selector Guide 36 is set for the Interleave Mode the master card is moved along the guide channel 12 into the Hold Station F. The card is driven to the left by a drive roller 37 situated to the left of the developer station. When the trailing edge of the master card has left this drive roller there is no more drive on the card so the card stops in the channel. At this time it has actuated microswitch SW20 whose normally open contacts close. At the conclusion of the next exposure cycle relay CR14 is energised and closes contacts CR14 (7-11) and in turn energises relay CR13 as already described. Energising relay CR13 closes contacts CR13 (7-11) in the circuit for the 'Hold' relay CR12. Relay CR12 locks up through its contacts CR12 (6-10) providing that there is a master card in the hold station actuating SW20 as stated. When CR12 is energised it closes contacts CR12 (8-12) which applies power to time delay relay TR5 (the Hold Time Delay Relay). When relay TR5 times out, contacts TR5 (4-7) close and apply power to the trigger of Quadrac Q3 which in turn energises solenoid S3 (master card Hold Solenoid). Solenoid S3 causes a friction drive wheel 38 to drive the master card on into the copy card receive hopper into which the copy cards are being fed. The time delay of TR5 is set sufficiently long to assure that the master card enters the copy card receive hopper H or G after the last copy card processed from that master has already been stacked in the hopper.

THE LAST COPY CARD

When the last master in a production run has been driven out of the exposure station, the copy card exposed from the master will be in the developer station D. It must be developed before being driven into the output hopper H or G. The copy card in the developer station actuates microswitch SW19 whose normally open contacts apply power to relay CR11. Energising relay CR11 closes contacts CR11 (6-10) in an alternative supply path to the Expose/Develop Spring Wrap Clutch 28. Since there is no master card in the exposing station C microswitch SW13 is not actuated and relay CR6 is not energised so that its normally closed contacts CR6 (3-11) are closed. Therefore power is applied to time delay relay TR4 through microswitch SW11 (normally closed) and Cam microswitch SW12 (normally closed) and contacts CR10 (4-12) as previously described. Since contacts CR6 (5-9) and CR9 (8-12) are both open the time delay period of relay TR4 is increased by the addition of resistor R22. This extra resistor is provided, not for the last card situation being described, but to cover the possibility of a slow feed of either the master card or copy card from their respective feed hoppers into the exposure station during the normal cycle of operation of the machine. In the present case, after the longer time delay period has elapsed, relay contacts TR4 (4-7) close to initiate the expose/develop cycle and thus develop and eject the last copy card as previously described.

CLEARING

When the 'Clear' switch SW14 is operated, power is applied to relay CR1 provided that relay CR2 is de-energised so that normally closed contacts CR2 (7-1) are closed. Energising relay CR1 (the Clear relay) closes contacts CR1 (5-9), CR1 (6-10), CR1 (7-11), CR1 (8-12) which trigger Quadracs Q1, Q2, Q4 and Q3 respectively. The quadracs in turn apply power to solenoids S1, S2, S4, and S3 which engage all the drive wheels in the master and copy card channels and drive all the cards out of the channels into the hoppers.

THE HOPPER INTERLOCKS

There are five hopper interlock switches. SW5 and SW15 are located in the Copy card and master card input hoppers A and B respectively. They are both released if there are no cards in the hoppers and actuated if there are cards in those hoppers. SW6F, SW6R and SW7 are located in the Front Copy Card Receive Hopper G, the Rear Copy Card Receive Hopper H and the Master Card Receive Hopper E respectively. They are all released if the hoppers are below their full capacity. When the card clamps in the hoppers are pushed to their limit by the size of the stack of cards in the hopper the microswitches become actuated. The function of SW15 in the master card feed hopper has already been described. This is different from the other cases because it is normal for the machine to run out of masters during normal operation. If any of the other switches becomes acutated they cause the machine to stop at the end of the current expose/develop cycle by removing the supply from relay CR2 which releases when contacts CR5 (9-5) open. The interlock switches also apply power to an indicator light L3 located in the 'Clear' swtich push button to alert the operator.

The accessory socket J1 (at the rear of the machine will allow a programmer unit) to be plugged into the machine. When the Programmer is switched on, the control of the number of copies to be made from each master is provided by the programmer. The programmer consists of a cassette recording system onto which the number of copies required from each master may be recorded. When the programmer is in use the feed of the master cards and the copy cards is controlled by signals from the programmer and the copy counter in the machine is disconnected. Having recorded the required number of copies from each master in sequence, on the tape, the masters are loaded into the hopper A in the same sequence as recorded together with sufficient copy cards to complete the run. The machine is started from a control on the programmer and feeds the first master card and copy card into the exposure station. At the end of the first exposure, the signal from the duplicator reduces the count in the programmer by one and another copy card is fed. When the last copy is made the programmer signals the duplicator to change both master and copy cards and this sequence repeats until all the copies of all the masters have been made. The Interleaving/Separate function operates in exactly the same way as described previously.

The way in which the master cards and copy cards are loaded into their respective input hoppers depends upon which generation of copy cards is being produced. So that maximum resolution may be obtained in the duplicates, it is necessary that the cards are loaded in a manner to permit their photosensitive surfaces to come in intimate contact when they are in the exposure station. As the copy cards proceed in the rear track 11 and the master cards proceed in the front track 12 this means that the photosensitive side of the copy cards will always have to face towards the front of the machine and the image side of the master cards will always have to face towards the rear of the machine. International standards dictate that all cards should have the image right reading when viewed from the front of the card, which is defined as the side containing the main printed information. The above standard means that the first generation card (which will contain the master camera negative) will have the imaged side of the film towards the rear unprinted side of the card and the second generation will be a copy card having its imaged side towards the front printed side of the card. The third and succeeding odd generations will have the imaged side towards the rear of the card (as the first generation) and the fourth and succeeding even generations will have the imaged side towards the front of the card (as the second generation). As the position of the photosensitive side of the copy cards and the imaged side of the master cards must remain fixed within the machine (copy card sensitive side facing the front of the machine, master card imaged side facing the rear of the machine). This means that the cards will have to be loaded into the hoppers differently when making odd generation copy cards from making even generation copy cards.

When making even generation images the copy cards must be loaded with their face to the front of the hoppers (i.e. so that suction feed wheels 17 and 23 in the hoppers touch the printed side of the cards). When making odd generation images the copy cards must be loaded with their face to the rear of the hoppers (i.e. so that the suction feeder wheels in the hoppers touch the unprinted side of the cards). This latter case means that the cards will, in fact, be loaded upside down in the hoppers.

SUMMARY OF MACHINE FACILITIES

A unique feature of the machine is its ability to feed out the master cards and copy cards in three different modes 1. The Separate Mode (the conventional mode) In this mode the 'Separate or Interleaving Mode Selector Guide' 36 is set to the 'Separate' position and the 'Front or Rear Interleaving Selector Guide' is set to feed the copy cards into the front or rear copy card receiver hopper as preferred. Alternatively the selector guide 14 can be set to deflect master cards into hopper G and copy cards into hopper H. Clearly the guide 36 could be dispensed with. When the master cards leave the exposure station they deflect into the Master Card receive hopper or in the hopper G and are stacked, one behind the other, in the same order in which they left the master card feed hopper. When the copy cards leave the developer station, they are stacked in one of the two copy card receive hoppers. If the Front or Rear Selector Guide is set for Front copy card receive hopper, the copy cards are stacked one behind the other in the same order in which they left the copy card feed hopper and also in the same order in which the master cards are stacked in the master card receive hopper. If the Front or Rear Selector Guide is set for the Rear copy card receive hopper, the copy cards are stacked one in front of the other in the reverse order to which they left the copy card feed hopper and also in the reverse order to which the master cards are stacked in the master card receive hopper. In both cases the face of all the cards will be towards the front of the machine.

2. The Interleaving Mode for making even generation copy cards. In this mode the 'Separate or Interleaving Mode Selector Guide' 36 where provided is set to the Interleaving position and the 'Front or Rear Interleaving Selector Guide' 14 is set to feed the copy cards and master cards into the rear copy card receive hopper. When the master cards leave the exposure station, they continue along the track into the master card hold station where they stop and wait for the copy card last exposed from them to be developed in the developer station, whilst a new master and copy card are being exposed in the exposure station. When the platens open, the last copy card from the master in the hold station is fed along the track and is deflected into the rear copy card receive hopper by the selector guide. When the copy card has entered the hopper, a time delay initiated by the opening of the platen, causes the master card in the master card hold station to be driven along the track and also to be deflected into the rear copy card receive hopper by the guide. In this way the master card is placed in the rear copy card receive hopper H in front of the copies that have been made from it. The copies from the next master are placed in front of the first master and the next master in front of these and so on. The stack of interleaved masters and copies is in reverse order (last master and copies in front) to the order that the masters were placed in the master card input hopper. In this case, the face of all the cards will be towards the front of the machine.

3. The Interleaving Mode for Making Odd Generation Copy Cards In this mode the 'Separate or Interleaving Mode Selector Guide' 36 where provided is set to the Interleaving Position and the Front or Rear Interleaving Selector Guide is set to feed the copy cards and Master Cards into the front copy card receive hopper. The operation of the machine is exactly the same as in the previous case except that the copy cards are fed into the front copy card receive hopper G and the master cards are placed behind them in the hopper. The stack of interleaved copies and masters is in the same order as the mastes were stacked into the master card feed hopper (i.e. last master at the rear of the machine). In this case the face of all the cards will be towards the rear of the machine (i.e. they will be upside down).

It will be apparent from the foregoing description that if a machine is required to provide purely an interleaving of copies and masters for one generation type duplicating, e.g. even generation, this could be performed with a single receiving hopper e.g. H. To extend such a machine to include the separate function can be effected either by including a master card receive hopper such as the hopper E and an associated selector guide such as 36 or by providing a hopper G and moveable selector guide 14 disposable between master and copy card paths to deflect master cards into hopper H and copy cards into hopper G. The latter arrangement with two hoppers can easily be extended to accommodate the two alternative modes of interleaving and separate mode by enabling suitable adjustment of the guide 14 as previously described.

It will be understood that the above description of the present invention is susceptible to various modification changes and adaptations.

What is claimed is:

1. A microfilm card duplicating machine comprising means for feeding copy cards sequentially to an image reproducing means for duplicating images carried by master cards fed thereto onto one or more copy cards per master, means for routing copy and master cards to a receiving station after copying and master card delaying means for enabling delivery of a master card to the receiving station only when its duplicate copy card(s) have been delivered thereto to form an interleaved stack of master and copy cards arranged with said one or more copy cards being preceded in each case by the associated master card.

2. A machine as claimed in claim 1, wherein the delaying means comprises a hold station arranged to receive a master card after exposure to reproduce the copy therefrom and to retain the master card for a predetermined delay period.

3. A machine as claimed in claim 1 wherein the image reproducing means comprises an exposure station for photographic contact exposure of copy and master cards and a developing station for processing copy cards after exposure.

4. A machine as claimed in claim 3 wherein both copy and master cards are routed through the developing station and means is provided for sensing the presence of a copy card in the developing station and for initiating the developing action.

5. A machine as claimed in claim 1, including separate guide tracks having track ends which are arranged adjacent and parallel to each other at the entry to the receiving station for feeding master cards to the receiving station.

6. A machine as claimed in claim 5 including cooperating feed rollers disposed at or near the end of the truck for feeding both master and duplicate copy cards therebetween to the receiving station.

7. A machine as claimed in claim 5 wherein the receiving station has two hoppers disposed on opposite sides of an axis extending between and parallel to the guide tracks at the receiving station and a selector guide to selectively direct the master cards and duplicate copy cards to one or the other hopper.

8. A machine as claimed in claim 7 wherein the selector guide comprises a card deflector having a tapered nose extending transversely of said track ends to form an acute angle against the feed direction of the cards and selectively locatable with the tapered end of the nose to one side or the other of the two tracks in dependance upon which hopper is to receive the cards.

9. A machine as claimed in claim 8 wherein the tapered nose is selectively locatable with the tapered end between the two tracks and facing towards the direction of feed of the cards to deflect the master and copy cards into separate stacks in opposite ones of the two hoppers.

10. A machine as claimed in claim 5 wherein the guide tracks extend in parallel adjacent disposition between receiving station and feed stations for master and copy cards via exposure and processing stations of the image reproducing means.

11. A machine as claimed in claim 10 including a further hopper disposed upstream of the track ends and a deflector moveable into the path of one of the tracks to deflect cards from that track into said further hopper to enable separation of master and copy cards.

12. A machine as claimed in claim 10 wherein the guide tracks each comprise a groove in which the cards are transported on edge.

13. A machine as claimed in claim 12, wherein the two grooves are each formed in a single elongate track member.

14. A machine as claimed in claim 12, wherein the cards are driveable along the tracks by means of drive rollers disposed on opposite sides of the tracks.

15. A machine as claimed in claim 14, wherein the copy cards and master cards are stoppable at processing positions along the track by displacement of the drive rollers in the vicinity of the processing position out of engagement with the card path.

16. A machine as claimed in claim 15 wherein the displaceable drive rollers are mounted on carriers, a pivot is provided for each carrier and the carrier is pivotally mounted on its pivot to enable pivotting of the carrier to engage and disengage the drive roller with the card path.

17. A machine as claimed in claim 16, wherein the carrier is provided with a card engagement portion located from the opposite side of the carrier pivot from the drive roller which engagement portion is moved into and out of the card movement path with disengagement and engagement of the roller with the card path.

18. A machine as claimed in claim 14 comprising a hold station arranged to receive a master card after exposure and a drive roller in the vicinity of the hold station wherein master cards are stoppable at the hold station by displacement of the drive roller out of engagement with the card path.

* * * * *